UNITED STATES PATENT OFFICE.

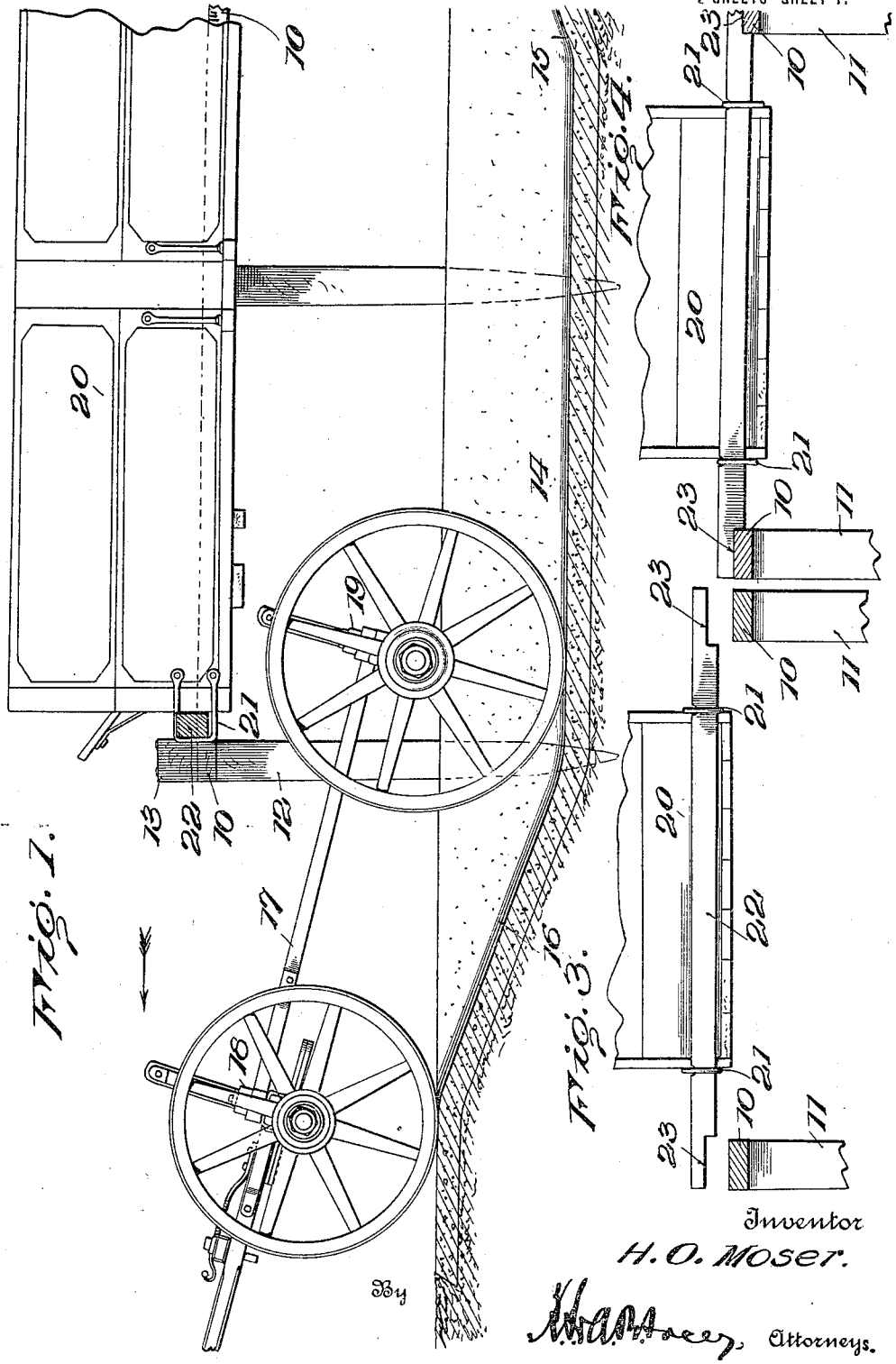

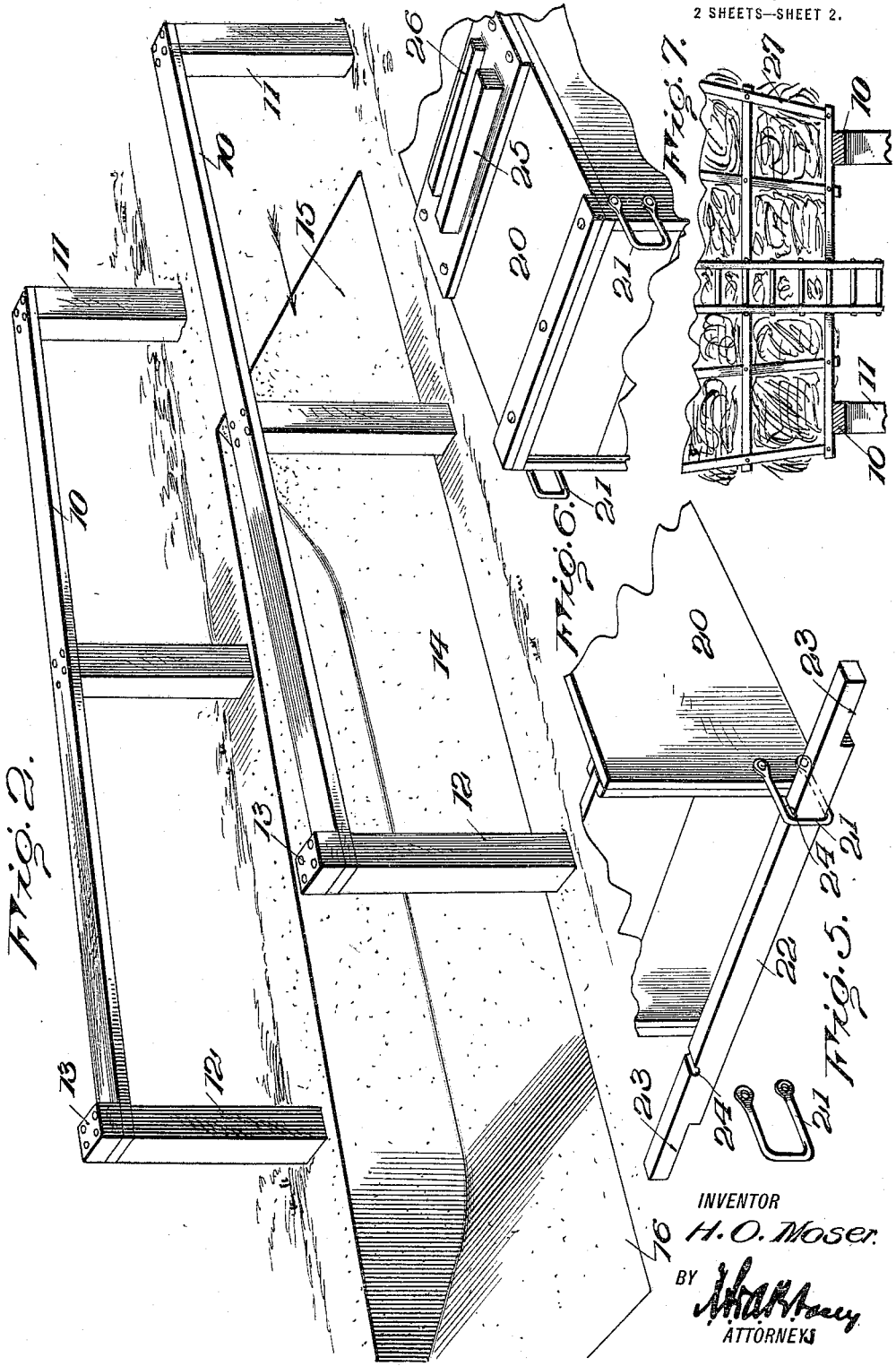

HENRY O. MOSER, OF BUFFALO GAP, SASKATCHEWAN, CANADA.

DEVICE FOR REMOVING AND REPLACING WAGON-BODIES AND THE LIKE.

1,272,500.

Specification of Letters Patent. Patented July 16, 1918.

Application filed May 26, 1917. Serial No. 171,198.

*To all whom it may concern:*

Be it known that I, HENRY O. MOSER, a subject of the King of Great Britain, residing at Buffalo Gap, in the Province of Saskatchewan and Dominion of Canada, have invented certain new and useful Improvements in Devices for Removing and Replacing Wagon-Bodies and the like, of which the following is a specification.

This invention relates to an improved device for removing and replacing wagon bodies, hay racks, grain tanks, and the like and has as its primary object to provide a construction wherein the body of a wagon may be removed by simply driving the wagon between a pair of supporting rails for the wagon body.

The invention has as a further object to provide a construction wherein the wagon body may be replaced by simply backing the wagon between the supporting rails for the wagon body to be automatically engaged with the body of the wagon for removing the wagon body from the said rails onto the wagon.

And the invention has as a still further object to provide an arrangement employing a driveway preferably in the form of a pit between the supporting rails for the wagon body so that upon driving the wagon through the driveway, the wagon will sink below the level of the said rails leaving the body of the wagon supported upon the rails and wherein by backing the wagon through the driveway, the wagon will be caused to rise beneath the wagon body to again engage therewith for lifting the body of the wagon from the rails onto the wagon.

Other and incidental objects will appear as the description proceeds and in the drawing wherein I have illustrated the preferred embodiment of the invention and wherein similar reference characters designate corresponding parts throughout the several views:

Figure 1 is a fragmentary side elevation showing the manner in which a wagon is passed through the driveway of my improved device for removing the wagon body, Fig. 2 is a perspective view particularly showing the supporting rails for the wagon body and the arrangement of the driveway with respect to the said rails, Fig. 3 is a fragmentary elevation illustrating the disposition of the wagon body with respect to the supporting rails when the wagon is upon the ground level, Fig. 4 is a similar view illustrating the manner in which the cross bars connected to the wagon body are adapted to engage with the supporting rails when the wagon is driven into the driveway beneath the said rails, Fig. 5 is a fragmentary perspective view showing the manner in which the cross bars are detachably connected with the wagon body, Fig. 6 is a fragmentary bottom perspective view showing the cross cleats carried by the rear extremity of the wagon body for engagement with the rear bolster of the wagon, and Fig. 7 is a fragmentary plan view showing a hay rack engaged with the supporting rails of my improved device.

In carrying out the invention, I employ a wagon body rack including spaced parallel supporting rails 10. These rails are mounted a suitable distance above the ground upon a plurality of posts and for convenience, the posts at one end of the rack have been indicated at 11 while the posts at the opposite end of the rack have been indicated at 12. Connected to the ends of the rails 10 above the posts 12 are suitable blocks forming stops 13. The rails 10 are of a length somewhat greater than that of the usual wagon body and are spaced such distance apart that a wagon may be readily driven between the said rails. Formed in the ground between the rails 10 is a longitudinally extending driveway or pit 14 which, as illustrated in Fig. 1 of the drawings, may, if desired, be lined with concrete. This driveway is of a width to easily accommodate the wheels of an ordinary wagon and at one end is provided with a grade 15, while, at its opposite end, the said driveway is formed with a similar grade 16. These grades are preferably sloped gradually so that a wagon may be either driven through the driveway or backed into one end of the driveway and out of the other without inconvenience. The grade 15 is arranged in advance of the posts 11 of the rack preferably a distance substantially equal to the respective diameter of the rear wheels of an ordinary wagon while the grade 16 is arranged in advance of the posts 12 of the rack a similar distance.

In order that the manner of use of my improved device may be clearly understood, I have conventionally shown a wagon 17 in connection therewith. This wagon is provided with the usual front bolster 18 and rear bolster 19. Formed to fit upon the said bolsters is the wagon body 20. For the purposes of the present invention, the wagon body is equipped at its extremities with pairs of oppositely disposed loops or brackets 21 preferably formed by U-bolts arranged at the lower corners of the wagon body and connected to the sides thereof with the said bolts extending longitudinally beyond the ends of the body of the wagon. These U-bolts each includes upper and lower members in spaced relation and are adapted to removably receive cross bars 22 projected through the said bolts to overhang the rails 10 of the rack, and at their extremities, the said cross bars are reduced to form stop shoulders 23 to engage with the said rails for holding the bars against longitudinal movement with respect to the rails. Upon their upper sides, the bars are further provided with transverse grooves 24 arranged, as particularly shown in Fig. 5, to receive the upper members of the U-bolts and thus coacting with the stop shoulders to hold the body 20 from lateral displacement relative to the rails. The wagon body is further equipped adjacent its rear extremity with transverse cleats 25 and 26 respectively, adapted to receive the rear bolster 19 of the wagon therebetween. As particularly shown in Fig. 6 of the drawings, the rear cleat 25 is preferably about twice as thick as the front cleat 26. The purpose of this arrangement will presently appear.

In order to remove the body 20 from the wagon, the wagon is driven between the rails of the rack, entering between the posts 11 and in this connection, it is to be observed that the rails 10 are, as particularly shown in Fig. 3, arranged above the ground level a distance somewhat less than the level of the floor of the wagon body when resting upon the wagon. The cross bars 22 may thus be readily engaged through the U-bolts 21 at the front and rear ends of the wagon body to overhang the rails 10. Accordingly, as the wagon is advanced between the rails, the front wheels of the wagon will descend the grade 15 into the driveway 14 when the front cross bar will be seated against the rails to disengage the front bolster 18 from the wagon body. In this position of the wagon, the wagon body will be tilted from the rear toward the front thereof since the back wheels of the wagon still remain upon the ground level. Consequently, the front cleat 26 upon the wagon body will be tilted to engage with the rear bolster 19 of the wagon so that as the wagon is further moved forwardly between the rails 10 the wagon body will be shoved forwardly with respect to the said rails until the rear wheels of the wagon descend the grade 15 to rest the rear cross bar upon the rails and disengage the rear bolster of the wagon from between the cleats 25 and 26 of the wagon body. The stops 13 are provided upon the rails to limit the wagon body in its forward sliding movement and with the wagon body thus supported upon the rails 10 by the front and rear cross bars 22, the wagon may be driven up the grade 16 and out of the driveway. In this connection, it will be observed that the notches 23 of the cross bars 22 will hold the said bars in proper engagement with the rails 10 of the rack while the grooves 24 in the bars will engage with the U-bolts 21 upon the wagon body for holding the wagon body against lateral movement with respect to the said rails.

For replacing the wagon body, the wagon is backed between the rails 10 of the rack entering between the posts 12. As the rear wheels of the wagon rise upwardly upon the grade 15, the rear bolster 19 will be moved to engage the thicker cleat 25 at the rear of the wagon body. The purpose in thickening this cleat now becomes apparent, since it will be seen that the cleat 25 will project below the cleat 26 into the path of the rear bolster for engagement therewith. The wagon body will thus be moved rearwardly upon the rails 10 of the rack as the wagon is backed through the driveway 14. The rear wheels of the wagon upon ascending the grade 15, will, of course, lift the rear end of the wagon body free of the rails 10 onto the wagon and in like manner the front wheels of the wagon upon ascending the grade 15 will lift the front end of the wagon body free of the rails to thus dispose the wagon body in position upon the wagon.

It will therefore be seen that I provide a particularly simple and efficient arrangement for the purpose set forth and a device which may be easily and quickly constructed at minimum cost. Furthermore, the nature of the device is such that it may be used in connection with substantially any conventional type of wagon body by simply equipping the wagon body with U-bolts similar to the U-bolts 21 or other similar fastening devices to receive the cross bars 22 and with a pair of cleats similar to the cleats 25 and 26.

In Fig. 7 of the drawings I have illustrated a hay rack 27 seated upon the rails 10 of the device. As is well known, a hay rack is wider than the usual wagon body and such a rack will accordingly project over the rails 10 to seat thereon and will thus not necessitate the use of the cross bars 22. For loading and unloading the rack upon a wagon the same procedure is followed as above described with respect to the wagon body. Accordingly, for the purpose of the present invention the term wagon body shall be considered to include a hay rack or any other like structure, as well as the common form of grain tank used as a wagon body for hauling threshed grain.

Having thus described the invention, what is claimed as new is:—

1. A device of the class described comprising horizontal supporting rails in spaced relation, a driveway associated with said rails and including a horizontal intermediate portion and inclined end portions, one of said inclined end portions being disposed intermediate the terminals of the rails and the other inclined end portion disposed in advance of the rails, a vehicle body, transverse bars supported upon the body and extended at the ends to bear upon the rails, transverse cleats arranged in pairs and connected to the body, the rearmost cleat being extended below the line of the remaining cleats in position to be engaged by the bolster of the vehicle when the same is moved through the driveway.

2. A device of the class described comprising horizontal supporting rails in spaced relation, a driveway associated with said rails and including a horizontal intermediate portion and inclined end portions, one of said inclined end portions being disposed intermediate the terminals of the rails and the other inclined end portion disposed in advance of the rails, a vehicle body, loop devices attached to the body and including upper and lower members in spaced relation, bars extending through said loop devices and extended to bear upon the rails and having transverse seats adapted to engage the upper members thereof when elevated and thus lock the bars to the loops.

3. A device of the class described comprising horizontal supporting rails in spaced relation, a driveway associated with said rails and including a horizontal intermediate portion and inclined end portions, one of said inclined end portions being disposed intermediate the terminals of the rails and the other inclined end portion disposed in advance of the rails, a vehicle body, loop devices attached to the body, and including upper and lower members in spaced relation, bars extending through said loop devices and extended to bear upon the rails and having transverse seats adapted to engage the upper members thereof when elevated and thus lock the bars to the loops, and with stop shoulders to limit the lateral movement of the bars.

In testimony whereof I affix my signature.

HENRY O. MOSER. [L. S.]